Oct. 27, 1959 ICHIRO MATSUDA 2,909,807
AUTOMATIC ROTATORY TYPE MACHINE FOR MAKING SHOES
OR BOOTS RUBBER-SOLED WITH HEAT AND COMPRESSION
Filed Oct. 6, 1955 6 Sheets-Sheet 1

INVENTOR
I. MATSUDA

BY
ATTORNEYS

Oct. 27, 1959　　　ICHIRO MATSUDA　　　2,909,807
AUTOMATIC ROTATORY TYPE MACHINE FOR MAKING SHOES
OR BOOTS RUBBER-SOLED WITH HEAT AND COMPRESSION
Filed Oct. 6, 1955　　　　　　　　　　　　6 Sheets-Sheet 2

INVENTOR.
I. MATSUDA
BY
ATTYS

Oct. 27, 1959 ICHIRO MATSUDA 2,909,807
AUTOMATIC ROTATORY TYPE MACHINE FOR MAKING SHOES
OR BOOTS RUBBER-SOLED WITH HEAT AND COMPRESSION
Filed Oct. 6, 1955 6 Sheets-Sheet 4

INVENTOR.
ICHIRO MATSUDA
By *[signature]*
ATTYS.

INVENTOR.
ICHIRO MATSUDA

United States Patent Office 2,909,807
Patented Oct. 27, 1959

2,909,807

AUTOMATIC ROTARY TYPE MACHINE FOR MAKING SHOES OR BOOTS RUBBER-SOLED WITH HEAT AND COMPRESSION

Ichiro Matsuda, Kita-ku, Tokyo, Japan

Application October 6, 1955, Serial No. 538,921

Claims priority, application Japan May 26, 1955

2 Claims. (Cl. 18—20)

The present invention relates to a new and improved apparatus, or machine, for automatically producing rubber-soled shoes or boots wherein the soles are affixed to the leather parts of the footwear so firmly that the footwear is substantially more enduring and water-proof than has been heretofore produced by presently utilized methods and apparatus.

It has been the usual practice heretofore in the production of rubber-solded shoes or boots to combine the leather part of the footwear with the rubber sole by either sewing the two together or by gluing the two together with an adhesive material, such for example, glue. The footwear products produced by these prior art methods have been found to be lacking in durability and water-proof characteristics by reason of the inherent limitations of the thread or adhesive materials employed to combine the parts of the footwear together.

Basically the operation of the new machine for fabrication of rubber-soled footwear comprises the utilization of half finished leather parts of the footwear wherein the instep leather, side leather and inside base of the sole have been firmly sewn together at their respective margins, affixing a half finished sole mixed with raw rubber upon the inside base of the sole, and shaping the sole by the process of vulcanization under suitable temperature and compression whereby the marginal portion of the instep leather and the side leather is embedded in the molded rubber sole so as to result in a durable, strengthened, and water-proof footwear product.

Additionally the invention contemplates the provision of a novel machine for the performance of the hereinabove described operation which comprises a female footwear mold having a heating arrangement, a footwear last, a footwear sole mold also having a heating arrangement, and a compression unit, each being substantially automatically operable by means of a circular rotatory base member. Operatively adjoining the base member are a pair of conveyers and an operating table.

Another object of the present invention is to provide new and improved apparatus for automatically, quickly and economically fabricating rubber-soled footwear.

A further object of my invention is to provide an automatic rotatory type machine which is capable of producing rubber-soled shoes or boots by the method conforming to the above-described new principle of my invention, and which is particularly suitable for mass production of refined, water-proof and durable rubber-soled shoes or boots. One important feature of the machine consists in that the rubber sole, mixed with raw rubber, is completely vulcanized and firmly fastened by heat and compression to the half-finished shoe or boot tightly placed on the shoe or boot last, at which station instep leather, side leather and inside base of the sole are sewed together at their margins. Another feature is that the work of shoe or boot making is automatically effected by means of a circular rotatory base, rotating slowly about a vertical axis, along the outer part of which a series of compressor units are arranged equidistantly, an operating table located tangentially to the rotatory base, and two conveyers, one for the half-finished shoes or boots positioned on the shoe or boot lasts and the other for the finished products, located on the right and the left sides of the operating table respectively.

The general description of the working mechanism of the machine will be given below. When one compressor unit on the rotatory base comes before the operating table, the female shoe or boot mold, which has been already heated and is connected to the rod of a horizontal piston set radially to the center of rotation of the rotatory base so that the female mold containing the shoe or boot last can be readily movable from the centrol portion of the compressing plate out to the operating table and vice versa, is pushed out to the operating table by the hand control of the distributing valve for the compressed oil or air, where a half-finished shoe or boot placed tightly on the shoe last brought by one conveyer is exchanged for the finished one in the female mold, and then, placing on the shoe last a rubber sole mixed with raw rubber, the female mold is drawn back to the former position on the compressing plate, which is operated by a large vertical piston so as to compress the shoe last and the rubber sole both contained in the female mold against the sole mold kept heated and fixed to the upper compressor plate. For setting the piston systems into operation compressed oil or compressed air is employed.

The rotatory base can make a slow intermittent rotation, and the rotation is so adjusted that, when one of the compressor units comes immediately before the operating table, the base ceases its rotation and the time interval of the remaining stopped is adjusted to be enough for the exchange operation of the shoe or boot last. The heating, which may be effected by either electricity or gas, is to be automatically arrested and initiated according to the start of the female mold from the central portion on the compressing plate and the return of the same to the position respectively. With heat and compression the rubber sole mixed with raw rubber will be vulcanized and fastened firmly to the inside base of the sole on the shoe last during the time of one complete revolution of the rotatory base, and after the exchange for a new half-finished shoe or boot the finished item is taken away by the other conveyer set on the other side of the operating table.

Thus as the operation of the machine for making shoes or boots of my invention is automatic and also of rotatory type so as to provide a flow system of work, much economy of time and labor can be obtained and therefore the commercial costs of the products can be greatly lowered.

A more detailed description of the working mechanism of the machine will now be given with reference to a particular embodiment of my invention as shown by the accompanying drawings wherein.

Figure 1:
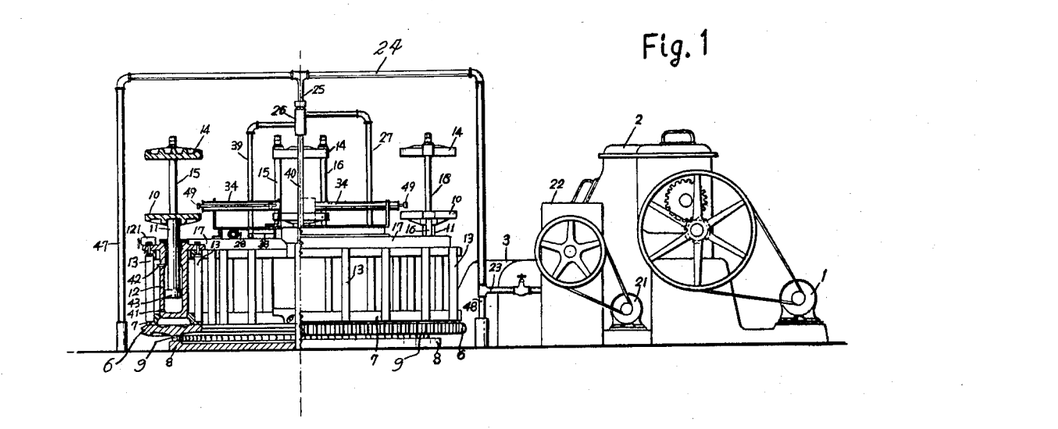
Fig. 1 is a side view of a mechanism of the machine system, where a half of the rotatory base system is shown in vertical section.
Figure 3:
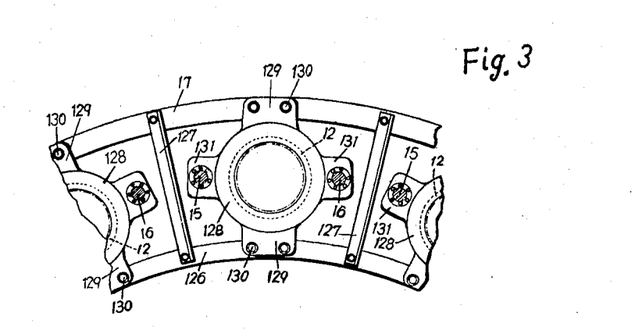
Fig. 3 is a fragmentary view of the top frame member of the rotatory system of Fig. 1.

The revolution of the prime motor 1 is transmitted to the reduction gear system 2 and then to the gear system 3 which converts the reduced rotation to an intermittent one. The shaft 4 thus made to rotate slowly and intermittently about a horizontal axis has a worm gear 5, which is in mesh with the gear 6 provided along the periphery of the rotatory base 7 so that the base can make a slow and intermittent rotation. As shown in the left half portion of Fig. 1 a thrust ball bearing 9 is employed between the rotatory base 7 and the fixed foundation 8 so that the base 7 rotates as smoothly as possible about a vertical axis. A series of vertical supporting frames 13 (Fig. 1) fixed to the circular rotatory base 7 along its outer part, and two ring frames, the outer one 17 and the inner one 126 (Fig. 3), which connect the supporting frames 13 at their upper ends and are themselves connected by the crossing bars 127, all constitute a one piece stout frame work firmly fixed with one another and also to the rotatory base 7. In the space surrounded by the two ring frames 17 and 126, and by the supporting frames 13 (Fig. 1) is placed the cylinder 12 for the vertical piston rod 11 rigidly connected to the compressing plate 10. The cylinder has a collar plate 128 at the top, which also has a pair of stout arms 129 resting on and fixed by the pins 130 to the ring frames 17 and 126 respectively. To a pair of stout flanges 131 projecting in a crossing direction to that of the arms 129 are bolted firmly two supporting pillars 15 and 16 (Figs. 3 and 5), which support the upper compressor plate 14 on their tops and extend somewhat loosely through the compressing plate 10 of the compressor. The base of the piston cylinder 12 is fixed to and supported by the rotatory base 7.

Figure 2:
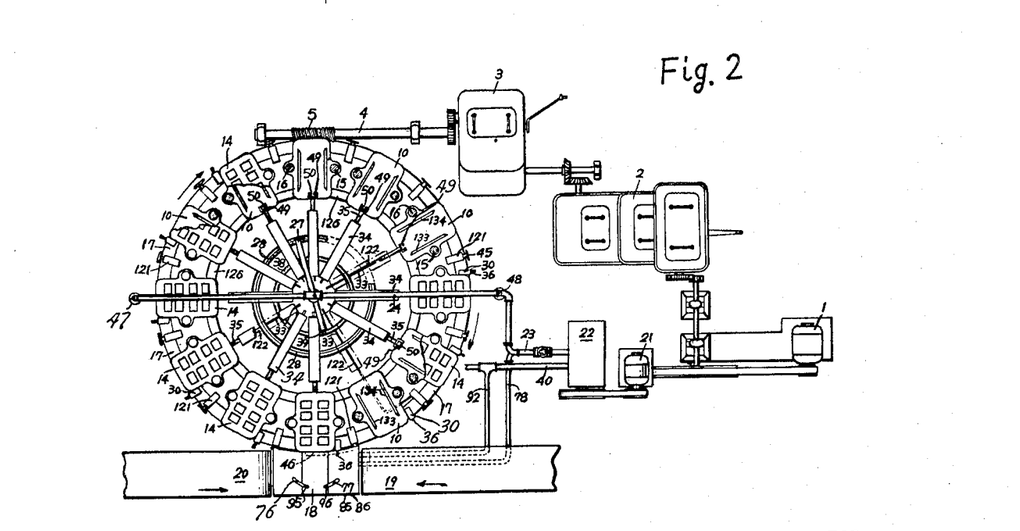
Fig. 2 is the top view of the machine system.

The operating table 18 is placed tangentially to the rotatory base 7. The form of the side of the table 18 facing the rotatory base is concave and parallel to the circular periphery of the base 7. Various rather complicated mechanisms are arranged under the table for the purpose of opening and closing the female shoe or boot mold to exchange the finished product for the half-finished one. As seen in Fig. 2 two conveyors 19 and 20 are set on the right and the left sides of the table 18 respectively. They both have a slow movement in the same direction. The upper surface of the operating table 18 and those of the conveyers 19 and 20 are adjusted to be in the same horizontal plane. Furthermore, when the compressing plate 10 is lowered at the most, the upper plane thereof coincides with that of the central lower part 135 of the table 18. Whenever a line passing through the centers of the rotatory base 7 and any one of the compressor units comes to the center of the operating table 18, the rotation of the base 7 stops due to the adequately designed intermittence of rotation, and after one operation of exchange of shoe or boot the rotation begins.

Figure 4:
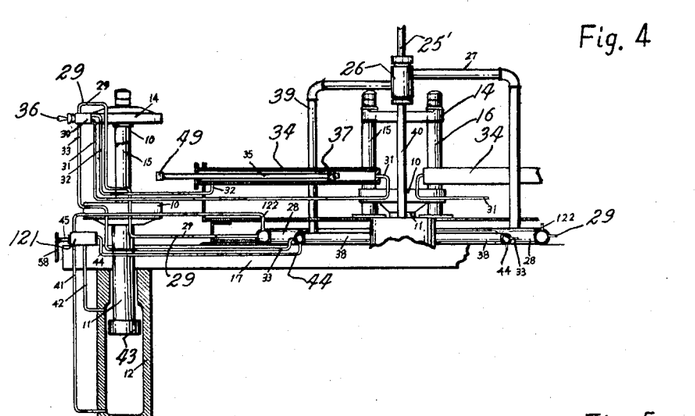
Fig. 4 is a side view of the oil piping system of the system of Fig. 1.

As shown in Fig. 4 the oil forced from the tank 22 by the compression pump operated by the motor 21 passes through the successive pipes 23, 24 and 25 supported by the supporting frames 47 and 48, and reaches the valve box 26, which is connected by the conducting pipe 27 to the ring pipe 28, set horizontally and coaxially with the ring frames 17 and 126. The ring pipe 28 is connected by the conducting pipe 29 to the distributing valve box 30 fixed to the upper compressor plate 14, and also by another conducting pipe 122 to a further distributing valve box 121 fixed to the ring frame 17. Each compressor unit system is equipped with a pair of similar distributing valve boxes 30 and 121.

From the distributing valve box 30 two conducting pipes 31 and 32 lead to the piston cylinder 34 and another exhaust pipe 33 leads from the same to the inner ring pipe 38 (Fig. 2). By hand control of the handle 36 provided for the distributing valve box 30, the compressed oil moving through the conducting pipe 29 to the valve box 30 can be directed to either pipe 31 or 32, and when one connection is made, the other pipe is connected to the exhaust pipe 33. Thus, for example when the oil pressure is conducted through the pipe 31 to the cylinder 34, the back surface of the piston head 37 of the piston rod 35 is pressed outwards, while the oil on the other side of the piston head 37 is discharged by the pipe 32 to the distributing valve box 30, where it is connected to the exhaust pipe 33. In order to draw back the piston rod 35 the hand control of the handle 36 is appropriately manipulated so that the connection of the pipes is reversed, and the oil in the cylinder is discharged through the pipe 31 to the exhaust pipe 33. The discharged oil is conducted through the pipe 33 to the ring pipe 38 and after passing through the pipes 39 and 40 returns to the tank 22.

Figure 6:
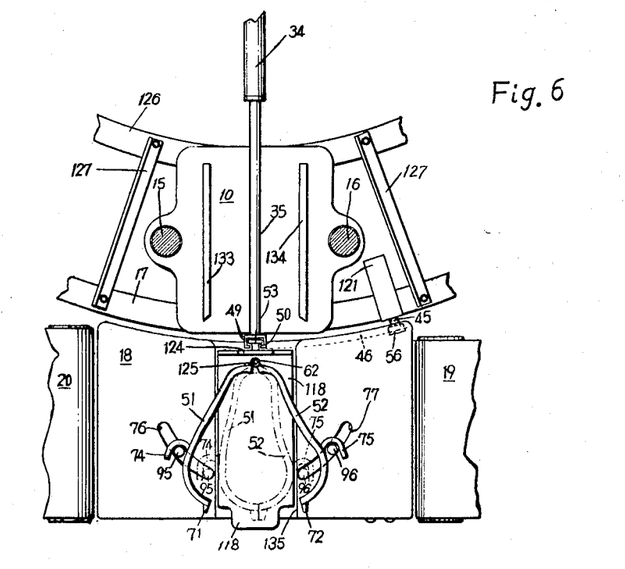
Figs. 6, 7 and 8 are views of the operating table and conveyers adjoining the rotatory system of Fig. 1.
Figure 12:
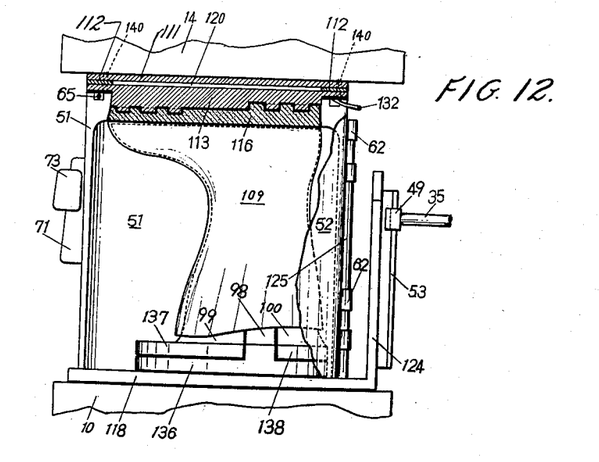
Fig. 12 illustrates an electric heating arrangement for the female mold.

At the end of the piston rod 35 opposite to the piston head 37 there is provided a coupler 49, for insertion in the opening 50 wherein is held a T-shaped tappet 53 fixed to the vertical plane part 124 of the base plate 118, on which is placed the female mold. The female mold consists of two parts 51 and 52 hinged together at the back, and the axial rod 125 of the hinges 62 are fixed to the base plate 118, so that by means of the coupler 49 the female mold (51 and 52) can make a movement radially to the center of rotation of the base 7 (Figs. 2, 6 and 12). The T-shaped tappet 53 is substantially extended in the vertical direction and is held rather loosely by the coupler 49 so as to allow a smooth upward and downward movement of the base plate 118 supporting the female mold and to secure it to be parted from the piston rod 35 during the up-down motion of the compressing plate 10 and the sliding motion of the base plate 118 in the radial direction.

The oil piping system for the piston cylinder 12 of the compressor unit is similar to the above-mentioned piston cylinder 34. The oil from the pipe 122 is directed by the control of the valve in the distributing valve box 121 through either pipe 41 or 42 to the piston cylinder 12 (Fig. 4). If the compressed oil is placed into the lower part of the piston head 43 of the piston rod 11 by the conducting pipe 41, the pipe 42 connected with the upper part of the cylinder is placed in communication with the exhaust pipe 44 by the control of the valve in the distributing valve box 121, and thus the compressing plate 10 rigidly connected to the piston rod 11 rises upwardly to give strong compression. By reversing the respective connections of the pipes 41 and 42 to the oil supplying pipe 122 and to the exhaust pipe 44, the compressing plate 10 descends rather quickly.

Figure 5:
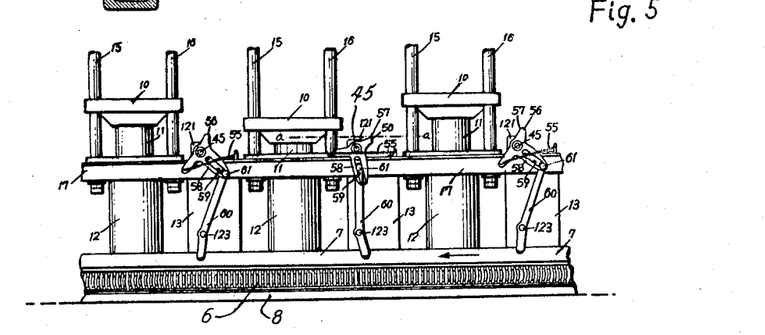
Fig. 5 is a view of the stopping control mechanism of the system of Fig. 1.
Figure 7:
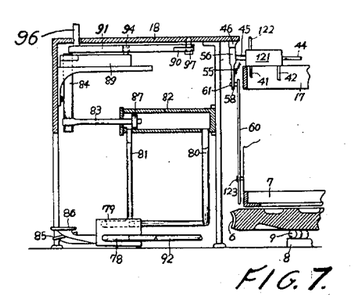

The control of the valve in the distributing valve box 121 fixed to the ring frame 17 can be effected by the rotation of the valve rod 45. As shown in Figs. 5 and 7, a T-shaped piece 56 is rigidly fixed to one end of the valve rod 45. From one end of the T-shaped piece 56 a spiral spring is stretched to the ring frame 17, and along the center line of its leg part 58 it is provided with a linear opening 59, through which is loosely inserted a pin 61 of a link 60 which can be smoothly rotated about a further pin 123 fixed firmly to the supporting frame 13 on the rotatory base 7 (Fig. 7). The rotation of the valve rod 45 can therefore be made smoothly by the rotation of the T-shaped piece 56, which rotation, by means of the link mechanism described, can be effected exactly in one vertical plane. The operating table 18 has along the half of its underside margin facing the rotatory base 7 a long flange 46 projecting downwards (shown by the dotted line in Figs. 6 and 8, and sectionally in Fig. 7), the position of the lower plane of the flange 46 being slightly higher than the vertical position of the valve rod 45 (the chain line a—a in Fig. 5 indicates the position of the lower plane of the flange 46). When a T-shaped piece 56 arrives at the operating table 18 by the rotation of the rotatory base 7 the edge 57 of the T-shaped piece 56 contacts with the lower face of the flange 46 and then the T-shaped piece 56 rotates. Consequently the valve rod 45 rotates and effects the valve in the distributing valve box 121 to enable the compressed oil to enter the conducting pipe 42 and the oil in the cylinder 12 to discharge into the pipe 41 whereupon the piston rod 11 begins to descend quickly.

As was described above, as soon as the center of one of the compressor units comes before the middle point of the operating table 18, the rotation stops for a while on account of the intermittent rotation mechanism, and during such time the vertical piston 11 remains in its lowest position, as the valve rod 45 is kept in its rotated position by the pressing action of the flange 46 on to the T-shaped piece 56. The rotation of the base 7 starting again, the portion of the rotatory base 7, where there is a valve rod 45, soon passes off the middle point of the operating table 18 where there is the end of the flange 46 (Fig. 6), and then as the T-shaped piece 56 is released from the pressure of the flange 46 and left under the sole action of the spring 55, it retains again its starting position. This results in the reverse rotation of the valve rod 45, controlling the distributing valve in the box 121 so that the compressed oil is forced to enter through the pipe 41 and the oil in the upper part of the cylinder 12 is discharged through the pipe 42 to the exhaust pipe 44. On account of this link system controlling the distributing valve in the box 121, the piston rod 11 begins to ascend. These descending and ascending movements of the piston rod 11 fixed to the compressing plate 10 are completely carried out automatically by means of the link system control of the oil distributing valve. Each of the compressor units set along the outer part of the rotatory base 7 is equipped with such a link arrangement (Fig. 5).

Figure 13:
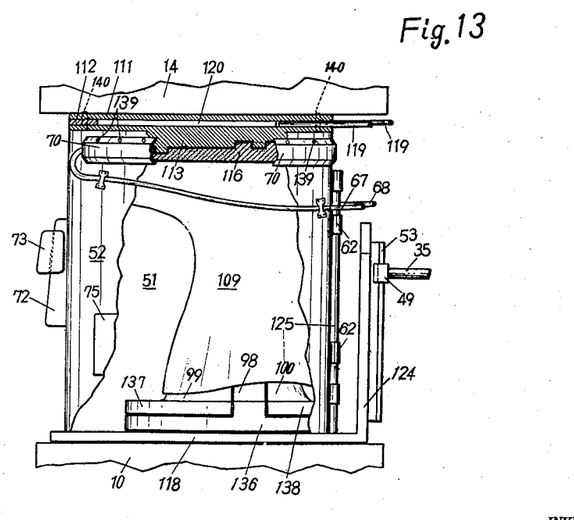
Fig. 13 illustrates a gas heating arrangement for the female mold.

As shown in Figs. 6, 10, 12 and 13 the female shoe or boot mold, or more specifically, a somewhat cylindrical metal box suitable for fastening the rubber sole mixed with raw rubber to the half-finished shoe or boot with heat and compression, consists of two parts 51 and 52 (Figs. 6, 10 and 12), which are hinged together by upper and lower hinges 62 (Figs. 12 and 13). It is placed on the base plate 118, to which is fixed an axial rod 125 of the hinges 62 so that the two parts 51 and 52 of the mold can revolve about the fixed axis of the hinges. The vertical plane part 124 of the base plate 118 has a T-shaped tappet 53 at the back, which is vertically extended and is loosely inserted in the coupler 49 rigidly connected to the piston rod 35 so that the base plate 118 supporting the female mold can make an upward and downward movement with the compressing plate 10 by a smooth sliding at the coupling without parting from the piston rod 35. The compressing plate 10 is provided with two leading flanges 133 and 134 on its upper surface (Fig. 6), and the distance between the flanges is a little greater than the width of the base plate 118. When one unit of compressor arrives and stops just before the operating table and the compressing plate descends completely, the base plate 118 with the female mold (51 and 52) thereon is pushed outwards along the leading flanges 133 and 134, and enters the central lower part 135 of the operating table 18 straight forwards without having its movement impaired at the boundary of the compressing plate 10 and the operating table 18.

Figure 10:
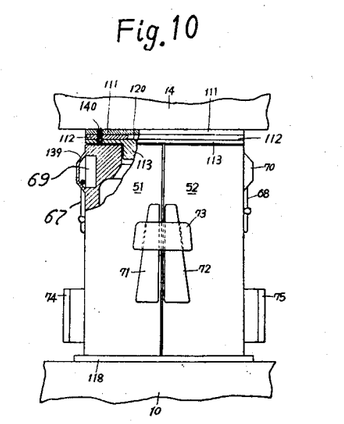
Figs. 10 and 11 are side views of the componential female mold.
Figure 11:
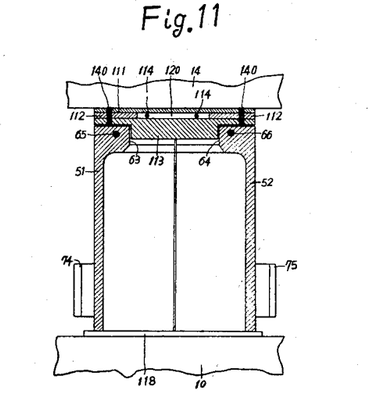

The top of the female mold is widely open and along the top margin of the mold is provided with thick inward flanges 63 and 64 corresponding to the parts 51 and 52 respectively, the inner shapes of which give the side figure of the rubber sole (Fig. 11). The electric heater wire (shown as 65 and 66) connected to the external wire 132 is imbedded in the flanges so as to surround the top part of the female mold to heat the side portion of the rubber sole. When gas heating is employed, the female mold (51 and 52) is equipped with the narrow combustion chambers 69 and 70 (Figs. 10 and 13) surrounding the top portion of the mold, to which the coal gas is introduced through the gas pipes 67 and 68 while the burned gas is exhausted through small holes 139 shown in Fig. 13.

The front view of the female mold is shown in Fig. 10, and the tapered handling flanges 71 and 72 are fixed on both sides of the central vertical line at which two parts 51 and 52 of the mold meet, and the clasp 73 is used simply to embrace the handling flanges 71 and 72 in order to secure the positive closing of the mold. On both sides of the female mold are fixed hook-shaped arms 74 and 75 respectively, of which the top view is shown in Fig. 6 and the side view in Fig. 10 or 11.

Figure 8:
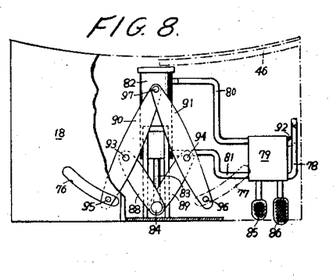

In order to open and to close the female mold pushed out to the operating table 18, a somewhat complicated mechanical arrangement is provided under the table. Fig. 7 shows that there is a horizontal piston rod 83 in the piston cylinder 82 fed by the oil pipe 80 or 81, to drive the vertical rod 84 connected to the piston rod 83 to undergo the radial movement against the center of rotation of the rotatory base 7. The motion of the vertical rod 84 is loosely joined to the links 88 and 89, which are again joined by loosely inserted pins 93 and 94 to the long links 90 and 91 respectively (Fig. 8), and two terminals of the links 90 and 91 are united as in Fig. 8 and revolve freely about the pin 97 fixed to the under face of the table 18, while to the other terminals of the long links 90 and 91 are fixed the respective vertical stems 95 and 96 extending through the holes of the plate of the operating table 18. According to the radial inward and outward movement of the vertical rod 84, the vertical stems 95 and 96 are forced to move along the respective long and narrow holes of the arc form 76 and 77 cut symmetrically as shown in Fig. 8 through the plate of the operating table 18. Thus, as the female mold (51 and 52) is impelled to the operating table 18, the hook-shaped arms 74 and 75 of the mold serve to catch the respective vertical stems 95 and 96, and by the inward motion of the piston rod 83 under the operating table 18 the female mold open symmetrically as shown in Fig. 6.

The oil piping system and the control of the distributing valve for the compressed oil are similar to those heretofore described for valves 30 and 121. The compressed oil from the oil tank 22 is moved through the pipes 23 and 78 (Figs. 2, 7 and 8) to the distributing valve box 79 under the operating table 18, from which two pipes 80 and 81 are connected to the piston cylinder 82, and the exhaust pipe 92 is led to the main exhaust pipe 40. For the sake of convenience of exchange of shoe or boot last, the control of the valve in the distributing valve box 79 is by the foot steps 85 and 86. When the compressed oil is forced through the pipe 81 to the left of the piston head 87 into the cylinder 82, the vertical rod 84 is drawn back, and both vertical stems 95 and 96 extending through the holes of the table 18 being forced by the link system to move outwards along the arc-form holes 76 and 77 respectively whereupon the female mold is opened.

Figure 9:
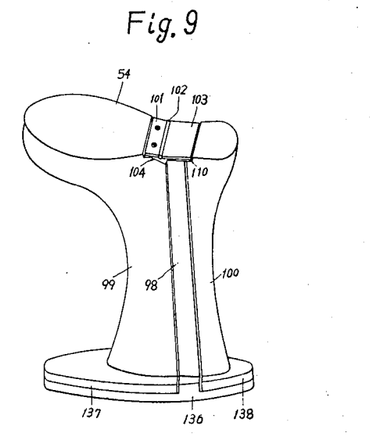
Fig. 9 is a view of the componential footwear last.

As shown in Fig. 9, the shoe or boot last 54 consists of three parts made of metal, namely the middle last 98, the instep last 99 and the heel last 100, capable of being maintained tightly in contact. The lasts have the respective bases 136, 137 and 138. It is seen in the figure that the instep last 99 has in the upper part of its contact surface with the middle last 98 a small plane part 104 slightly inclined to the upper base plane, to which is attached a small sustaining plate 101. The sustaining plate 101, the spanning plate 103 hinged thereto by the hinges 102 and the base planes of the instep last and the heel last, form roughly a plane, i.e., an inside surface of the shoe or boot sole. When the half-finished shoe or boot 109 (Fig. 12), of which the instep leather 105, the side leather 106 and the inside base 107 of the sole are sewed together at their margins by the thread 108 (Fig. 18), is to be placed on the shoe or boot last 54, the instep last 99 at first and then the heel last 100 are placed into the half-finished shoe or boot, and after that the middle last 98 tapered slightly upward (Fig. 9) is to be inserted between the instep last 99 and the heel last 100 so as to secure the tightness of contact between the shoe leather and the shoe last, and also the maintenance of the proper state of tension over all parts of the shoe leather. Illustrating more specifically the devices taken for the tightness and the fitness of contact of all parts of shoe leather 109 to the last 54, the spanning plate 103 which by means of the hinged sustaining plate 101 is connected to the instep last 99, is supported at its other end on the terrace part of the heel last 100 slightly lower than the upper plane surface of the last (Fig. 9), the upper surfaces of the lasts 99 and 100, and those of the plates 101 and 103 all coinciding roughly in one plane. Even when the instep and the heel lasts alone are positioned into the half-finished shoe or boot, the foot part of the shoe or boot leather is well expanded, and by inserting the middle last 98, tapered upwards, between the instep last 99 and the heel last 100 the contact between the three lasts 98, 99 and 100 and also between the lasts and the parts of leather can be made to be ideally intimate whether the shoe or boot is treated.

Figure 14:
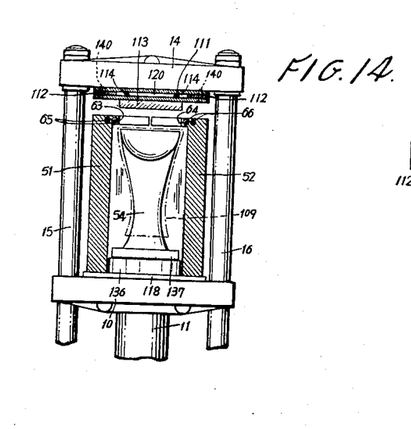
Fig. 14 is a view of the compression unit during the vulcanizing process.
Figure 15:
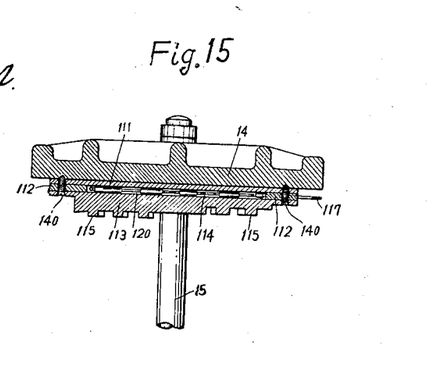
Figs. 15, 16 and 17 are detailed views of the upper compression plate of the compression unit of Fig. 14.
Figure 16:
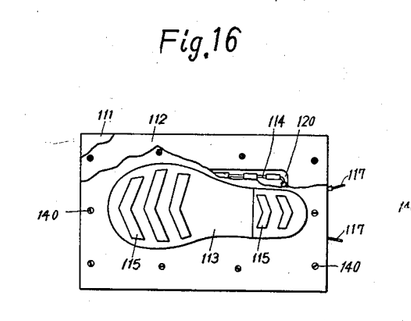
Figure 17:
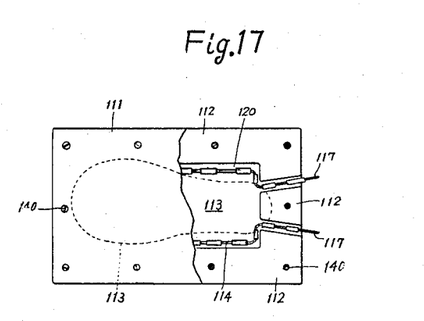

As more clearly shown in Figs. 14 and 15, the shoe or boot sole mold 113 is fixed to the upper compressor plate 14 which is supported by the supporting pillars 15 and 16. More specifically, beneath the upper compressor plate 14 are fastened successively in parallelism, an insulating plate 111 and an insulating margin plate 112, and further beneath the plate 112 is fastened the shoe sole mold 113 (Figs. 12, 15 and 16). Within the internal hollow space 120 enclosed by the described insulating plate 111, 112 and the sole mold 113 is the seat of the electrical heater wire 114 connected to the external leading wire 117 (Fig. 16), or of the combustion chamber for the coal gas fed by the pipes 119 (Fig. 13), so as to heat the shoe or boot sole mold 113 from above. The heating of the sole mold is not intermittent, but continuous as long as the machine is in operation. In the case of heating by the combustion of coal gas, the gas produced by combustion escapes through small clearances not shown in the figures. The under surface of the sole mold 113 is engraved with suitable patterns such as at 115 in Fig. 16 or other necessary commercial marks which are found on the rubber sole face for the purpose of avoiding slippage and for many other purposes.

Figure 18:
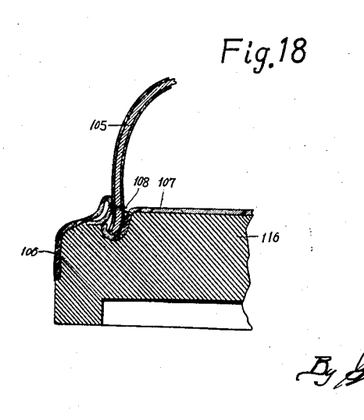
Fig. 18 is a view of the finished footwear product.

Fig. 18 illustrates the finished footwear product after vulcanizing of the sole to the half finished footwear. As shown, the side leather 106 attaches to the upper side face of the rubber sole 116 thereby effecting a substantially complete attachment between the rubber sole 116 and the leather part of the footwear.

The operation of the machine of my invention, of which the construction and the work-mechanism of the main parts have been described heretofore and its method of manufacturing automatically the rubber-soled shoes or boots with heat and compression will now be described more completely.

The shoe (boot) last 54, on which is positioned a half-finished product 109, being carried slowly by the conveyer 19 on the right hand side of the operating table 18 (Fig. 2), is previously heated during conveyance to a certain suitable temperature by the heater set under the conveyer. On the other hand, when one of the compressor units set on the rotatory base 7 which is in an intermittent slow rotation, arrives immediately before the operating table 18, the rotation of the base 7 stops, while the T-shaped piece 56 fixed rigidly to the valve rod 45 of the distributing valve box 121 (Figs. 2 and 5) is caused to rotate by the flange 46 projecting downwards from the operating table 18 along the underside of the margin of the table facing the rotatory base 7, and thus the compressing plate 10 of the unit automatically descends, the finished product being off from the sole mold 113 owing to the weight of the last 54 and the female mold (51 and 52), and descending together with the compressing plate 10. As soon as the upper surface of the compressing plate 10 reaches the plane of the central lower part 135 of the operating table 18, the controlling handle 36 is quickly operated to start the outward movement of the piston rod 35. At the same time the electric heating circuit in, or the supply of coal gas to, the female mold is automatically terminated, while the heating in the sole mold continues. As the base plate 118 supporting the female mold (51 and 52) and the shoe last 54, connected by the coupler 49 with the piston rod 35 is forced to move out to the operating table 18, where the hook-shaped arms 74 and 75 set on the both sides of the female mold catch the respective vertical stems 95 and 96 extending from under the table 18, the clasp used to unite tightly two parts 51 and 52 of the female mold is removed. Then by operation of the foot step 85 or 86, the vertical stems 95 and 96 linked to the piston rod 83 are driven to the right and left directions along the curved holes 76 and 77 respectively with the result that the female mold (51 and 52) is opened, and the parts 51 and 52 revolve about the axis of the axial rod 125 of the hinges 62.

The shoe or boot last 54, upon which the shoe or boot perfectly rubber-soled with heat and compression during the time of one complete revolution of the rotatory base 7, is removed from the opened female mold and is carried off in the direction marked by an arrow in Fig. 2 by the conveyor 20 on the left side of the operating table 18. A new shoe or boot last on which is put a half-finished shoe or boot, carried by the conveyer 19 to the table 18, is placed into the opened female mold on the base plate 118, and after positioning the rubber sole and raw rubber to be fastened to the shoe or boot on the shoe or boot last the female mold is closed tightly by operation of the foot step 85 or 86, and the clasp 73 placed to embrace firmly the handling flanges 71 and 72. By manual operation of the controlling handle 36 the female mold is again drawn back to the former position on the compressing plate 10. Simultaneously the electric heating circuit is automatically energized, or an automatic supply of coal gas is effected. The rotatory base 7 then starts its intermittent rotation and, as soon as the T-shaped piece 56 is released from the action of the flange 46 of the operating table 18, the compressing plate 10 begins to ascend against the sole mold 113, which is continually heated. The compressing plate 10 rising, the sole mold 113 fits into the opening made by the upper flanges 63 and 64 of the female mold (51 and 52), and thus the rubber sole 116 is compressed against the inside base 107 of the sole and the side leather 106, by the sole mold 113 from above, by the flanges 63 and 64 from all sides and by the shoe or boot last 54 from beneath.

As the result of such continual compression at the pressure of about 2800 pounds per square inch caused by the compressor system together with the continual heating at the temperature of about 140° C., the rubber sole mixed with raw rubber, during one complete revolution of the rotatory base 7, is completely vulcanized and integrally fastened to the half-finished product. The shoe or boot finished in the course of one complete revolution is exchanged for a new half-finished one. This hereinbefore described process of rubber soling is repeated in each one of the compressor units successively.

The automatic rotary type machine of my invention as hereinbefore described can be readily employed for making either shoes or boots, of leather or canvas for male or female, adult or child. The shoes or boots produced by the machine of this type have rubber soles integrally formed to the inside base of shoes or boots, to the instep leather and to the side leather thereby producing not only completely waterproof shoes or boots but also such durable items that, even if in the course of time the thread with which the above-mentioned parts are sewed together might be broken the rubber sole could never be stripped off from the shoe or boot leather parts. As the operation of the shoe or boot making machine of my invention is automatic and also of the rotatory type so as to practise a flow system of work, much economy of time and labours can be effected whereby the commercial costs of the products can be materially lowered.

While I have described a particular embodiment of my invention, it is clear and obvious that various changes in the construction and mechanism of the machine described may be made without departing from this invention.

Having thus described the nature of the said invention and the best means I know of carrying the same into practical effect, I claim:

1. A machine for rubber-soling leather footwear comprising, in combination, a plurality of lasts upon which the footwear to be rubber-soled are individually positioned, a rotatable annular table, a plurality of compression units equidistantly arranged upon said table, a female mold operatively associated with each of said units, said mold adapted to enclose one of said lasts with the footwear positioned thereon, a loading platform disposed tangentially relative to said table, said platform having positioned thereon successive ones of said plurality of lasts, a flange formed on said platform, hydraulic means for automatically effecting intermittent rotation of said table sufficiently to successively position each of said units adjacent said platform, hydraulic means individual to each of said units and actuable by said flange for automatically rendering respective units ineffective when positionally adjacent said platform, operator controlled hydraulic means individual to each of said units for effecting positioning of the associated female mold with an enclosed last and footwear positioned thereon within said unit when positionally adjacent said platform thereby vulcanizing the rubber-sole to the footwear, and upon completion of one rotation of said table for effecting ejection of said female mold upon said platform, and operator controlled hydraulic means on said platform for effecting opening of said female mold upon ejection thereof thereby to enable operator removal of the vulcanized footwear and replacement of the last positioned upon said platform.

2. A machine for rubber-soling leather footwear comprising, in combination, a plurality of lasts upon which the footwear to be rubber-soled are individually tensionally mounted, a rotatable annular table, a plurality of vertically movable compression units equidistantly arranged upon said table, a female mold operatively associated with each of said units, said molds adapted to enclose said lasts, a loading platform disposed tangentially relative to said table, said platform having positioned thereon one of said plurality of lasts, conveyer means for effecting successive positioning of said plurality of lasts upon said platform, means for automatically effecting intermittent rotation of said table to successively position each of said units adjacent said platform, a flange formed on the underside of said platform, spring urged rotatable means individual to each of said units and actuable by said flange for rendering said compression units ineffective when positionally adjacent said platform, operator controlled hydraulic means individual to each of said units for positioning the female mold associated with the unit positionally adjacent said platform upon said platform and for subsequently positioning the associated female mold within its compression unit, clasps formed on said female molds, and operator controlled hydraulic means on said platform for engaging said clasps thereby to open said molds thereby to enable operator removal of the last therein with the last positioned on said platform.

References Cited in the file of this patent

UNITED STATES PATENTS

| | | |
|---|---|---|
| 1,508,858 | Sandborg et al. | Sept. 16, 1924 |
| 2,045,705 | Finn | June 30, 1936 |
| 2,058,880 | Hunt | Oct. 27, 1936 |
| 2,247,818 | Nast | July 1, 1941 |
| 2,364,858 | Lee | Dec. 12, 1944 |
| 2,553,999 | Beanovsky | May 22, 1951 |
| 2,689,375 | Hugger | Sept. 21, 1954 |
| 2,715,751 | Weber | Aug. 23, 1955 |

FOREIGN PATENTS

| | | |
|---|---|---|
| 487,437 | Italy | Dec. 2, 1953 |